Figure 1:
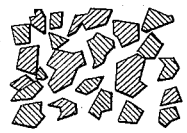

May 22, 1951 — D. PALL — 2,554,343
ANISOMETRIC METALLIC FILTER
Filed July 22, 1947

DAVID PALL
INVENTOR.

BY Richard S. Jewks
ATTORNEY

Patented May 22, 1951

2,554,343

UNITED STATES PATENT OFFICE 2,554,343

ANISOMETRIC METALLIC FILTER

David Pall, New York, N. Y.

Application July 22, 1947, Serial No. 762,784

6 Claims. (Cl. 210—205)

This invention relates to porous metallic filters.

An object of this invention is to provide filter elements of corrosion resistance greater than any hitherto manufactured.

A further object of this invention is to provide mechanically strong filter elements of corrosion resistance greater than any heretofore disclosed.

A further object is to provide filter elements which can be heated in air without damage at temperatures higher than any heretofore disclosed.

A further object is to provide filters of which the pores can be freed of entrapped particles after use either by heating to red heat or by treating with powerful reagents such as concentrated nitric acid or by chromic acid or concentrated caustic solutions, or by all of these separately.

A further object is to provide filter elements of uniform, controlled porosity.

Filters are frequently used to separate solids from corrosive liquids, and in many cases must be very resistant to corrosion in order to have a usefully long life, and to prevent contamination of the material being filtered. Moreover, when the filter contains fine pores, even a very slight amount of corrosion may be very harmful; for example, if the material of the filter corrodes to produce an insoluble product, this will act to clog up the pores and render the filter non-permeable and useless; on the other hand if the material of the filter is attacked and forms a soluble product, the average pore size will increase substantially permitting finer particles to traverse the filter, and resulting in contamination of the filtrate. In either case the filter will have a short life.

In order to make a metallic filter with sufficient corrosion resistance to be useful for filtering nitric acid, sulfuric acid, acid salts, hydrochloric acid, phosphoric acid, acetic acid, caustic solutions, chlorine solutions, bleaching solutions, ammonia and ammonium salt solutions, and other corrosive media, recourse must be had to the chromium containing alloys, such as the alloy containing 64% of iron and 18% of chromium and 8% of nickel often referred to commercially as 18-8, or the alloy containing 50% of iron, 35% of nickel, and 15% of chromium, or to the alloys containing substantial quantities of chromium and nickel, the balance being iron, or to the nickel base alloys containing substantial quantities of molybdenum and/or chromium, or of cobalt base alloy containing chromium and/or molybdenum and/or nickel.

I have prepared sufficiently corrosion resistant filters by loosely spreading the finely divided powders of these alloys upon an inert base, for example an alumina ceramic plate, and heating them in a reducing atmosphere, but I have found that the resulting filter bodies are excessively weak and friable, and are not sufficiently strong to be used in industrial or laboratory filtering operations. This is so even when the heating or sintering operation is carried out at temperatures as high as 1300 degrees C., or within about 100 degrees of the melting point. This behaviour is common to all alloys containing more than about 5% of chromium. When the heating or sintering operation is carried out at a still higher temperature within 50 degrees C. of the melting point, strong plates are obtained, but an excessive amount of shrinkage is observed. In addition to the obvious disadvantage of decreasing the area of the sheet obtained, two other serious disadvantages result from this shrinkage. The first of these is that the finished sheet, though strong, has a very low flow capacity relative to the size of the pore openings. The second disadvantage is that it is exceedingly difficult to control the average pore size and the flow capacity of the sheet. A change of only two or three degrees C. in the temperature of the furnace will result in a change of 20% or more in flow capacity, and in spite of every effort to control temperature very closely, even different parts of the same sheet show quite different flow capacity. Since present methods available for control of furnace temperatures at about 1300–1400 degrees C. are not able to consistently control temperature to closer than about plus or minus ten degrees C., it is apparent that control of flow properties and the average pore opening (upon which the flow is dependent) are not satisfactory.

Since making this type of filter and finding it virtually impossible to control flow and pore size within usual commercial limits, I have discovered a means for making a strong, ductile filter, which has a much higher flow capacity for a given average pore opening, and of which I have been able to control the flow properties and average pore size with excellent precision and accuracy.

In the operation of the new method, a layer of stainless steel powder is levelled upon a ceramic plate, for example by drawing a doctor blade over a heap of the powder, then another ceramic plate of equal size is placed upon the layer of powder. The assembly is placed in the furnace and heat treated at a temperature of about 50 degrees C. below the melting point, in an atmosphere reducing or non-oxidizing to the alloy used.

Upon removal from the furnace, the resulting metal sheet is found to be strong, ductile porous structure, with tensile strength as high as 30,000 pounds and elongation as high as 5% (2" gauge length). Its length and width are practically unchanged from those of the starting layer of powder, but shrinkage in thickness has occurred, with reduction of thickness between about 20 and 40%. Successive sheets prepared in this manner can be sintered at temperatures differing from each other by as much as 20 degrees C., with a difference in flow capacity of only 10% or less, with correspondently minor variations in strength and ductility.

I have found that the separating ceramic plate should have at least a micro-rough surface in order to prevent lateral shrinkage, and that the ceramic cover plate must have a minimum weight per unit of area. When a fairly rough ceramic is used, such as an alundum plate containing a proportion of component grains larger than will pass a 50 mesh screen, I have found that the weight of the cover plate per square centimeter of surface should not be less than 0.5 gram per square centimeter. If it is desired to economize on the ceramic material necessary to provide this required minimum weight, we have found it satisfactory to use a very thin ceramic layer over the powder and to superimpose on this layer a sheet of steel or other heavy metal.

I have also found that once a cover plate of more than the minimum weight has been provided, that further increase in weight has little effect upon the shrinkage and porosity of the finished filter. Therefore I have found it possible to make up many super-imposed layers consisting of, first a ceramic plate, then a layer of powder, then another ceramic plate, then another layer of powder, then another ceramic plate. I have repeated the process until as many as eight porous metal sheets were obtained from a single pile. The properties of the upper porous sheet were substantially the same as those of the lower sheet, and all showed high flow capacity and strength. As mentioned above, a steel or other metal plate may be substituted for a ceramic plate if an intermediate layer of ceramic material is provided.

I have also used a type of steel plate in which the ceramic aluminum oxide-iron oxide-layer is inherently a part of the steel plate, made up by the process known as calorizing. I have also used a heavier silicon carbide plate coated with lighter but more inert aluminum oxide. I have also used silica and other ceramic cover plates and separators.

I have found that this process if particularly applicable when used with the higher melting alloys, such as those melting at 1200 degrees C. or more. I have operated mainly with pre-alloyed powders, but mixed powders may be used as well. The particles of which the powder is composed should be uniform in size for best results.

Figure 2:
Figure 3:

I believe that the probable behaviour is illustrated in Figures 1 to 3. Figure 1 shows the section, greatly magnified through a layer of powder before sintering. Figure 2 shows the structure obtained by uncontrolled shrinkage. It will be noticed that in Figure 2 the pores are closed by an equal amount in all directions as a result of the shrinkage. In Figure 3 there is illustrated the structure obtained by controlled shrinkage, such as is obtained when a cover of proper minimum weight and roughness is used. Here the shrinkage is in a vertical direction only, so that those pores which carry fluid through the filter have remained open to their full width. At the same time their length has been decreased, which tends to increase the flow capacity. This explains why the greater flow results from the use of the controlled shrinkage process. At the same time, it is readily seen that since the shrinkage of the pores in the important dimension is reduced to a very low value when the controlled shrinkage process is used, that the value of the flow capacity will not be strongly affected by slight changes in sintering conditions. It should be understood that the value of this invention rests not upon the correctness of the theory, but rather upon the results observed.

Porous metallic filters composed of a single metal or of alloys of a plurality of metals, in accordance with the present methods, possess greater permeability to fluids under pressure in a direction substantially perpendicular to the plane in which the sheet of filter is made than in direction substantially parallel to said plane. Microscopic observation of sections taken in various planes shows that the average pore opening is larger in the plane parallel to the plane in which the sheet of filter was formed.

I have successfully and repeatedly made filters of stainless steel of the 18% chromium 8% nickel variety, of the 25% chromium 20% nickel variety, also 35% nickel, 10% chromium, the nickel base alloys containing 30% chromium, of 70% copper-30% nickel alloys, and of 60% cobalt-20% molybdenum alloys.

I claim:

1. A fluid-permeable metallic filter comprising an anisometric network in sheet form of interconnected aggregates of united metal particles of a stainless alloy of a base selected from the group consisting of iron, cobalt and nickel and containing at least 5% chromium, the aggregates defining open spaces intercommunicating throughout the aggregate network to define pores extending from surface to surface of the sheet for flow therethrough of the filtered fluid, the said aggregates being anisometrically distributed in the network such that the average percentage of solid aggregate material in any plane at right angles to the plane of the sheet is greater than the average percentage of solid aggregate material in any plane parallel to the plane of the sheet, whereby the average cross-sectional pore area in any plane parallel to the plane of the sheet is greater than the average cross-sectional pore area in any plane at right angles to the plane of the sheet, and the flow capacity transversely of the plane of the sheet is greater than the flow capacity in any plane parallel to the plane of the sheet.

2. A fluid-permeable metallic filter in accordance with claim 1 in which the metal particles comprise an iron base stainless alloy containing at least 8% nickel and 18% chromium.

3. A process of preparing a fluid-permeable metallic filter having a high flow capacity transversely of the plane of the filter which comprises confining a layer of metal particles of a stainless alloy of a base selected from the group consisting of iron, cobalt and nickel and containing at least 5% chromium between two inert nonadhering plane friction surfaces, which surfaces are at least microrough to increase the frictional contact between the surface and the metal particles and at least as rough as the surface of a layer of particles containing an appreciable proportion of component grains larger than 50 mesh, and then sintering the layer of metal particles in a nonoxidizing atmosphere at a temperature below their melting point, but not less than 100° C. below their melting point, while applying moderate pressure of not less than 0.5 g./cm.$^2$ to the layer through the surfaces, whereby lateral shrinkage of the layer is restrained and the thickness thereof is reduced through the joint co-operation of the applied pressure and the restraining action of the rough friction surface and a sintered sheet is formed comprising an anisometric network of interconnected aggregates of united metal particles, the aggregates defining open spaces intercommunicating throughout the aggregate network to define pores extending from surface to surface of the sheet for flow therethrough of the filtered fluid, the said aggregates being anisometrically distributed in the network such that the average percentage of solid aggregate material in any plane at right angles to the plane of the sheet is greater than the average percentage of solid aggregate material in any plane parallel to the plane of the sheet, whereby the average cross-sectional pore area in any plane parallel to the plane of the sheet is greater than the average cross-sectional pore area in any plane at right angles to the plane of the sheet.

4. A process in accordance with claim 3 in which the friction surface comprises aluminum oxide.

5. A process in accordance with claim 3 in which the friction surface comprises a ferrous plate surfaced with a ceramic material.

6. A process in accordance with claim 3 in which the friction surface comprises a ferrous plate surfaced with aluminum oxide.

DAVID PALL.

REFERENCES CITED

The following references are of record in the file of this patent:

UNITED STATES PATENTS

| Number | Name | Date |
|---|---|---|
| 1,819,927 | Taylor | Aug. 18, 1931 |
| 2,027,963 | De Bats | July 14, 1936 |
| 2,149,596 | Gillett et al. | Mar. 7, 1939 |
| 2,219,423 | Kurtz | Oct. 29, 1940 |
| 2,350,179 | Marvin | May 30, 1944 |
| 2,368,458 | Engle | Jan. 30, 1945 |
| 2,437,127 | Richardson | Mar. 2, 1948 |

OTHER REFERENCES

Powder Metallurgy, by Wulff, 1942, pages 139–144.